United States Patent [19]

Kawashima et al.

[11] Patent Number: 5,388,115
[45] Date of Patent: Feb. 7, 1995

[54] ABSOLUTE MEASURING APPARATUS USING LASER AND SCANNING MIRRORS

[75] Inventors: Hiroyuki Kawashima; Fumio Ohtomo; Susumu Saito; Isao Minegishi, all of Tokyo, Japan

[73] Assignee: Kabushiki Kaisha Topcon, Japan

[21] Appl. No.: 61,555

[22] Filed: May 17, 1993

[30] Foreign Application Priority Data

May 20, 1992 [JP] Japan .................. 4-151136

[51] Int. Cl.$^6$ .......................... H01S 3/10; G01C 3/00
[52] U.S. Cl. ........................ 372/24; 372/23; 372/43; 372/109; 356/4.5; 356/356
[58] Field of Search ................ 372/7, 9, 15, 18, 19, 372/23, 24, 28, 29, 30, 32, 38, 43, 107, 108, 109; 356/3, 4.5, 9, 10, 11, 351, 356, 358

[56] References Cited

U.S. PATENT DOCUMENTS

| | | | |
|---|---|---|---|
| 4,413,905 | 11/1983 | Holzapfel | 356/4.5 X |
| 4,468,773 | 8/1984 | Seaton | 372/32 |
| 4,611,915 | 9/1986 | Gillard et al. | 356/349 |
| 4,729,653 | 3/1988 | Kobayashi | 356/4.5 |
| 4,824,251 | 4/1989 | Slotwinski et al. | 356/349 |
| 4,912,716 | 3/1990 | Mead | 372/32 |
| 4,918,700 | 4/1990 | Gambini | 372/32 |
| 4,930,895 | 6/1990 | Nishimura et al. | 356/356 |
| 4,973,153 | 11/1990 | Yokokura et al. | 356/4.5 |
| 5,042,042 | 8/1991 | Hori et al. | 372/32 |
| 5,067,813 | 11/1991 | Ishizuka et al. | 356/351 |
| 5,068,864 | 11/1991 | Javan | 372/32 |
| 5,070,250 | 12/1991 | Komatsu et al. | 356/356 X |
| 5,123,730 | 6/1992 | Holmes et al. | 356/4.5 X |
| 5,127,731 | 7/1992 | De Groot | 372/32 X |
| 5,164,789 | 11/1992 | Yoshitake et al. | 356/349 |
| 5,231,467 | 7/1993 | Takeuchi et al. | 356/356 |

*Primary Examiner*—Brian Healy
*Attorney, Agent, or Firm*—Ronald P. Kananen

[57] ABSTRACT

An absolute length measuring apparatus comprising light sources, a beam splitter, an object of measurement, a scanning mirror, a light receiver, sampling parts and a distance measuring part. The light sources emit alternately a plurality of coherent light beams having different wavelengths. The beam splitter splits the coherent light beam from the light sources into two optical paths. The object of measurement is located on one of the two optical paths stemming from the beam splitter. The scanning mirror is located on the other optical path stemming from the beam splitter and made movable in the direction of optical axis. The light receiver receives both the reflected light beam from the object of measurement and the reflected light beam from the scanning mirror through the beam splitter. The sampling parts generate sampling signals of various wavelengths by sampling the output of the light receiver every time the light sources emit a coherent light beam while scanned by the scanning mirror. The distance measuring part assumes a synthetic wavelength signal having a wavelength sufficiently greater than any individually generated wavelength based on the phase relations of the sampling signals, and measures the distance to the object of measurement in accordance with the synthetic wavelength signal.

4 Claims, 7 Drawing Sheets

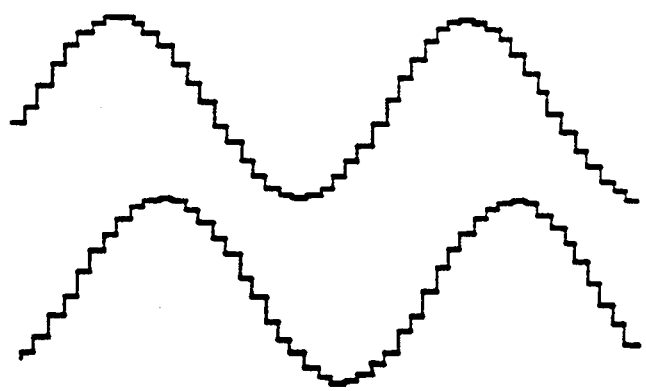
FIG. 4a
FIG. 4b
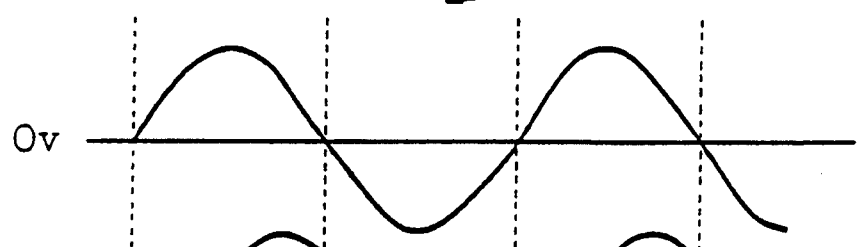
FIG. 4c
FIG. 4d
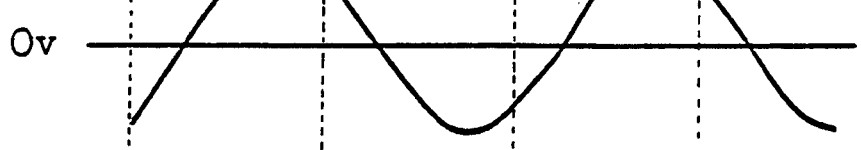
FIG. 4e
FIG. 4f
FIG. 4g
FIG. 4h
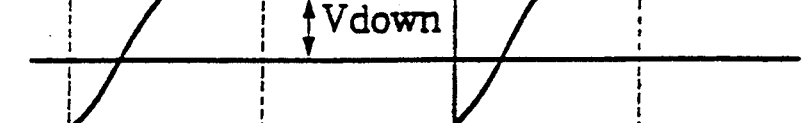
FIG. 4j
FIG. 4i

ABSOLUTE MEASURING APPARATUS USING LASER AND SCANNING MIRRORS

BACKGROUND OF THE INVENTION:

The present invention relates to an absolute length measuring apparatus that provides measurements of the absolute length up to a target object using laser interference.

One prevalent conventional method based on laser interference for taking measurements of absolute lengths involves combining wavelengths. The typical length measuring apparatus operating on the above method has two laser beams, say $\lambda1$ and $\lambda2$, oscillating alternately with wavelengths slightly different from that of the carbon dioxide gas laser($CO_2$ laser). The two laser beams $\lambda1$ and $\lambda2$ are led into a two-beam interferometer. The reflector of one arm in the interferometer is swept so that detectors's outputs are subjected to signal processing. From the detectors, there are derived synthetic wavelength signals whose wavelengths are appreciably longer than the original wavelengths of $\lambda1$ and $\lambda2$. The phases of the synthetic wavelength signals are measured, whereby measurements of the absolute length to the target are taken within the synthetic wavelengths.

In practice, the combination of two oscillation wavelengths from the carbon dioxide gas laser is varied appropriately. That is, measurements are taken repeatedly starting with the synthetic longest wavelength followed by progressively shorter synthetic wavelengths, until individual wavelengths are used for the measurement. The repeatedly taken measurements are processed to enhance the level of measuring precision.

One disadvantage of the above conventional apparatus is its huge size. This is partly because the apparatus uses a carbon dioxide gas laser as its light source. To generate synthetic wavelength signals in practice requires moving the sweeping reflector at least half the longest synthetic wavelength over a stage. The stage alone needs to be an elaborately constructed sizable arrangement. Another disadvantage is that it takes very long to complete the phase measurements based successively on a plurality of synthetic wavelengths as well as on individual wavelengths.

SUMMARY OF THE INVENTION

It is therefore an object of the present invention to provide an absolute length measuring apparatus capable of taking measurements without actually generating synthetic wavelength signals.

In carrying out the invention and according to one aspect thereof, there is provided an absolute length measuring apparatus comprising: light sources for emitting alternately a plurality of coherent light beams having different wavelengths; a beam splitter for splitting the coherent light beam from the light sources into two optical paths; an object of measurement located on one of the two optical paths stemming from the beam splitter; a scanning mirror located on the other optical path stemming from the beam splitter and made movable in the direction of optical axis; a light receiver for receiving both the reflected light beam from the object of measurement and the reflected light beam from the scanning mirror through the beam splitter; sampling parts for generating sampling signals of various wavelengths by sampling the output of the light receiver every time the light sources emit a coherent light beam while scanned by the scanning mirror; and a distance measuring part for assuming a synthetic wavelength signal having a wavelength sufficiently greater than any individually generated wavelength based on the phase relations of the sampling signals, and for measuring the distance to the object of measurement in accordance with the synthetic wavelength signal.

In a preferred structure according to the invention, if one of the coherent light beams has a first wavelength $\lambda1$ and another a second wavelength $\lambda2$, the distance measuring part assumes the wavelength $\Lambda$ of the synthetic wavelength signal to be a least common multiple of the first wavelength $\lambda1$ and the second wavelength $\lambda2$. The distance measuring part then measures the distance to the object of measurement based on the phase $\Phi$ of the synthetic wavelength signal derived at the time of measurement from the phase relations between the sampling signals having the first and the second wavelength.

In a further preferred structure according to the invention, the distance measuring part assumes the wavelength $\Lambda$ of the synthetic wavelength signal to be a least common multiple of the first wavelength $\lambda1$ and the second wavelength $\lambda2$. The distance measuring part then measures the distance to the object of measurement ($d5-d4-d1+d2$ in FIG. 1) based on the phase $\Phi$ of the synthetic wavelength signal derived at the time of measurement from the phase relations between the sampling signals having the first and the second wavelength. The least common multiple is given as $(\lambda1 \times \lambda2)/|\lambda1-\lambda2|$ if the values $\lambda1$ and $\lambda2$ are sufficiently close.

Because it is possible to assume a synthetic wavelength signal having a wavelength sufficiently greater than the wavelengths of any two sampling signals based on the phase relations of the two signals, there is no need actually to generate the synthetic wavelength signal.

The distance to the object of measurement is acquired based on the phase $\Phi$ of the synthetic wavelength signal thus assumed. Because semiconductor lasers instead of carbon dioxide gas lasers are used as its light sources, the absolute length measuring apparatus is made compact in scale.

These and other objects, features and advantages of the invention will become more apparent upon a reading of the following description and appended drawings.

BRIEF DESCRIPTION OF THE DRAWINGS

FIG. 4(a)-(j) is a view depicting signal waveforms in connection with the feedback arrangement of FIG. 3;

DESCRIPTION OF THE PREFERRED EMBODIMENT

Figure 1:
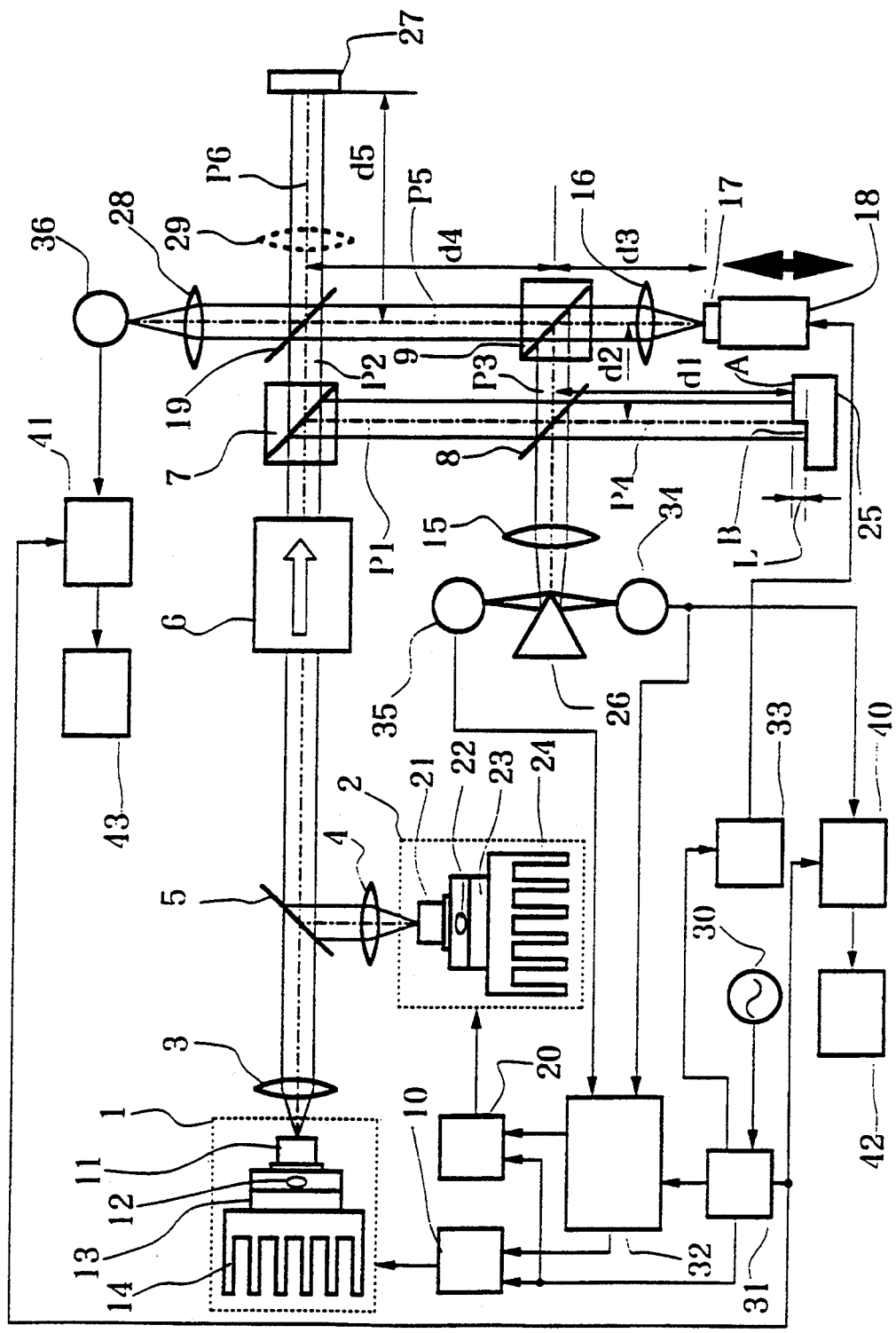
FIG. 1 is a block diagram of an absolute length measuring apparatus embodying the invention.

FIG. 1 shows a typical constitution of an absolute length measuring apparatus embodying the invention, the apparatus including two semiconductor lasers. Light sources 1 and 2 are of the same structure. The light source 1 is composed of a semiconductor laser 11, a thermistor 12, a Peltier device 13 and a radiator 14; the light source 2 is made of a semiconductor laser 21, a thermistor 22, a Peltier device 23 and a radiator 24. The light sources 1 and 2 are pulse-driven alternately by light source driving circuits 10 and 20, respectively. The light source 1 and the light source driving circuit 10 constitute a light source section; the light source 2 and the light source driving circuit 20 constitute another light source section.

Laser beams emitted by the light sources 1 and 2 are collimated by collimator lenses 3 and 4, respectively. The collimated beams converge and share the same optical axis at a beam splitter 5. The beam stemming from the beam splitter 5 passes through an isolator 6 to enter a polarizing beam splitter 7. The polarizing beam splitter 7 splits the laser beam received into an S-polarized light component P1 and a P-polarized light component P2.

The S-polarized light component P1 is split by a beam splitter 8 into a reflected light beam P3 and a transmitted light beam P4. The reflected light beam P3 is reflected by a polarizing beam splitter 9. The reflected light beam from the polarizing beam splitter 9 passes through a condenser lens 16 before being reflected by a scanning mirror 17. The reflected light beam from the scanning mirror 17 returns over the same optical path to enter again the beam splitter 8. The light beam having passed through the beam splitter 8 proceeds to a condenser lens 15. Meanwhile, the transmitted light beam P4 is reflected by a first reflecting surface A and a second reflecting surface B of a two-stage or staggered mirror 25. The light beam P4 thus reflected returns over the same optical path to be reflected by the beam splitter 8. After being reflected by the beam splitter 8, the light beam P4 overlaps with the reflected light from the scanning mirror 17 to become an interfering light beam that is condensed by the condenser lens 15. A stage-distance or stagger L exists between the first reflecting surface A and the second reflecting surface B of the staggered mirror 25. The stagger L is provided in the direction of the optical axis of the transmitted light P4.

Of the interfering light beam, the beam components coming from the first and the second reflecting surface A and B are divided by a prism 26 and detected by detectors 34 and 35, respectively. The outputs of the two detectors 34 and 35 are used to stabilize the oscillation wavelengths of the semiconductor lasers 11 and 12. Furthermore, the output of the detector 34 is used to measure the difference in length between optical paths d1 and (d2+d3) as shown in FIG. 1. The optical path length difference thus measured provides an origin signal used by the embodiment for measurement. The distance to a reflecting mirror 27 (d5−d4−d1+d2) is measured with reference to that origin signal.

The P-polarized light component P2 is split by a beam splitter 19 into a reflected light beam P5 and a transmitted light beam P6. The reflected light beam P5 passes through the polarizing beam splitter 9 as well as the condenser lens 16 and is reflected by the scanning mirror 17. The reflected light beam from the scanning mirror 17 returns over the same optical path to again enter and pass through the beam splitter 19. Past the beam splitter 19, the light beam proceeds to a condenser lens 28. Meanwhile, the transmitted light beam P6 is reflected by the reflecting mirror 27 (i.e., the object of measurement). The reflected light beam from the reflecting mirror 27 returns over the same optical path to be reflected by the beam splitter 19. After being reflected by the beam splitter 19, the light beam P6 overlaps with the reflected light from the scanning mirror 17 to become an interfering light beam that is condensed by the condenser lens 28. The condensed light from the condenser lens 28 is detected by a detector 36. The output of the detector 36 is used to measure the difference in length between optical paths (d3+d4) and d5 (FIG. 1). This optical path length difference is compared with the other optical path length difference measured with reference to the origin signal. The difference thus obtained between the two optical path difference measurements provides the ultimate output of the embodiment.

The scanning mirror 17 is attached illustratively to a piezoelectric device 18 such as PZT. The mirror is swept in the arrowed direction of FIG. 1 (i.e., in the direction of the reflected light beam P5) by the length of a plurality of waves generated by the semiconductor lasers 11 and 21, the sweeping being effected according to the ramp waves from an oscillator 30, a pulse signal generator 31 and a PZT driver 33. The sweep frequency is sufficiently lower than the driving frequency of the semiconductor lasers. The reflecting mirror 27 and the staggered mirror 25 are both fixed. Because the embodiment utilizes the semiconductor lasers and has the scanning mirror 17 swept by the piezoelectric device 18, the overall size of the apparatus is drastically reduced.

Below is a detailed description of how the oscillation wavelength of the semiconductor lasers in the embodiment is stabilized. It is assumed that the optical path length (d2+d3) between the beam splitter 8 and the scanning mirror 17 in FIG. 1 is substantially the same as the optical path length d1 between the beam splitter 8 and the first reflecting surface A of the staggered mirror 25. The output signal from the detector 34 is a fringe scan signal with an optical path length difference of near 0; the output signal from the detector 35 is a fringe scan signal with an optical path length difference of about 2 L. These output signals are used to stabilize the wavelength of the semiconductor lasers.

Figure 2:
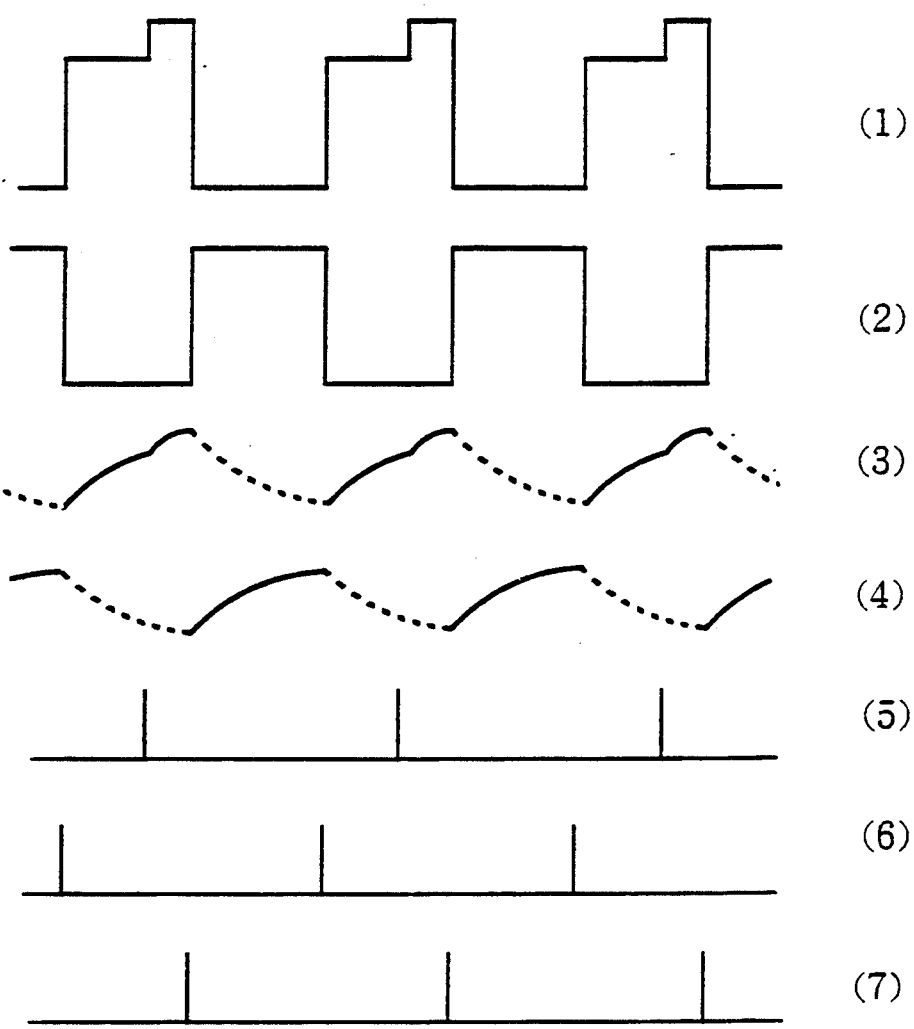
FIG. 2(1)-(7) is a view showing signal waveforms in connection with the embodiment of FIG. 1.

The semiconductor lasers 11 and 21 in FIG. 1 are pulse-driven by signals (1) and (2) of FIG. 2, respectively. The resulting waveforms (3) and (4) from the semiconductor lasers 11 and 21 indicate that the pulsated laser beams have their wavelengths constantly changed. In this case, the pulsated laser beams are stabilized in wavelength at constant timings. Specifically, signals are extracted from the outputs of the detectors 34 and 35 in FIG. 1 at timings of (5) and (6) in FIG. 2, and the wavelengths of the pulsated laser beams are stabilized at these timings.

Figure 3:
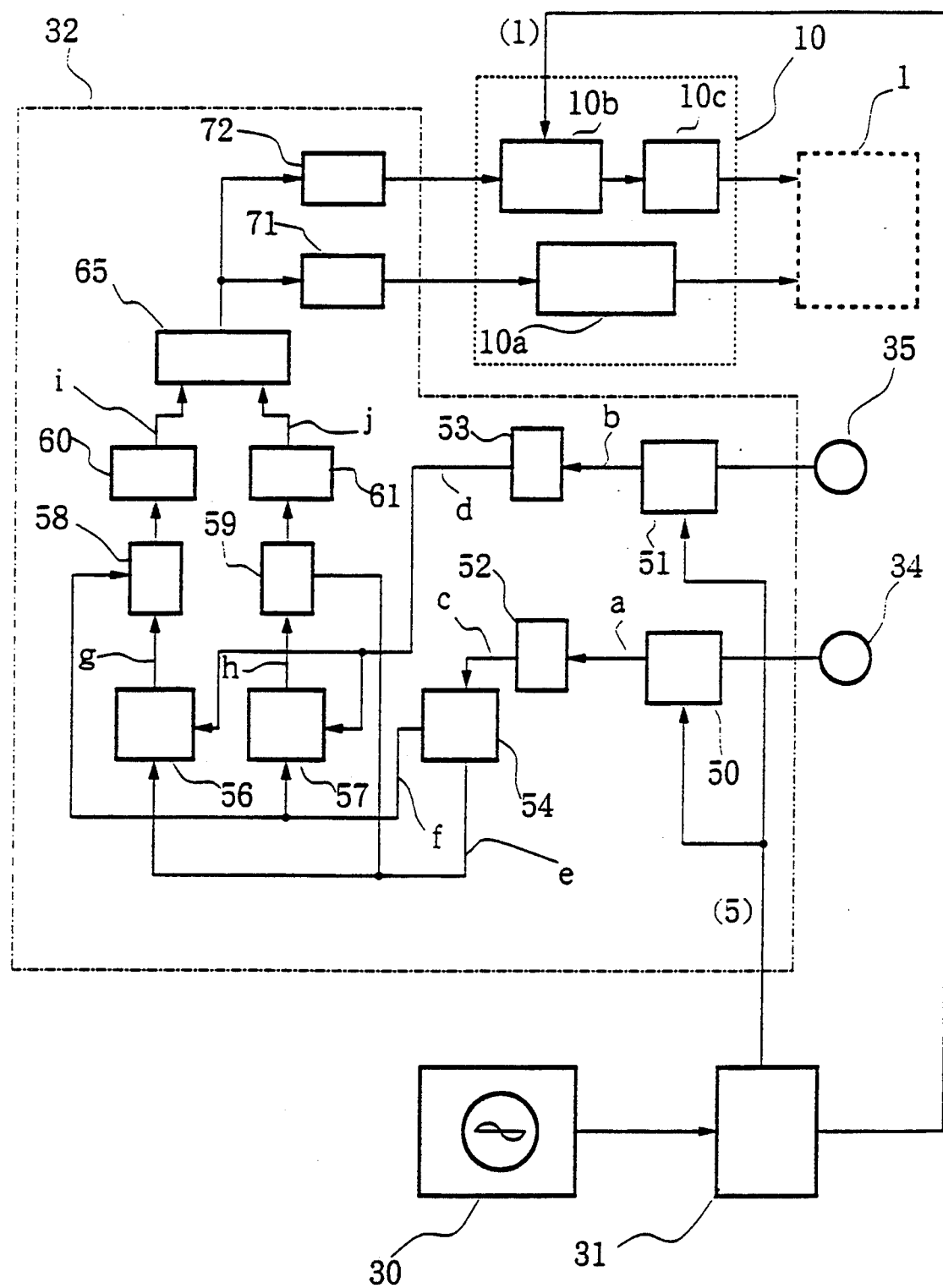
FIG. 3 is a view of a feedback arrangement included in the embodiment of FIG. 1.

FIG. 3 shows a typical construction of a feedback arrangement included for wavelength stabilization in the embodiment. FIG. 4 depicts signal waveforms in connection with the feedback arrangement of FIG. 3. Although FIG. 3 indicates only the feedback arrangement of the light source 1 for the sake of simplicity, the feedback arrangement for the light source 2 is identical to what is shown here.

The outputs of the detectors 34 and 35 are sampled and held by sample hold circuits 50 and 51 using the signal (5). The sample hold circuits 50 and 51 yield signals a and b of FIG. 4, respectively. Having the signals a and b pass through filters 52 and 53 provides signals c and d, respectively. The signals c and d are compared in phase. The result of the comparison is processed and fed through the light source driving circuit 10 of FIG. 3 back to the light source 1 so that the two signals c and d will coincide with each other in phase. That in turn stabilizes the wavelength at the timing (5). The two signals are matched in phase by simply varying the temperature or injection current of the semiconductor laser 11 (or 12) to change the oscillation wavelength thereof.

A comparator 54 in FIG. 3 converts the signal c of FIG. 4 into two square wave signals e and f with their phases made opposite to each other. The signal d is sampled and held by sample hold circuits 56 and 57 at leading edges of the signals e and f. The sample hold circuits 56 and 57 yield outputs g and h. The held portions of the outputs g and h are further sampled by sample hold circuits 58 and 59 and sent to low-pass filters 60 and 61. The low-pass filters 60 and 61 provide outputs i and j shown in FIG. 4, respectively. The outputs i and j are amplified differentially by a differential amplifier 65. The resulting signal from the amplifier 65 is a feedback signal reflecting the phase difference between the signals c and d. Returning the feedback signal to suitable temperature and/or injection current adjusting arrangements of the light source stabilizes the oscillation wavelength thereof.

The circuit construction of FIG. 3 is an example in which the feedback signal is fed to both the temperature and the injection current adjusting arrangements. In this example, the output of the differential amplifier 65 is fed to two low-pass filters 71 and 72 having different time constants and different amplification degrees. The low-pass filters 71 and 72 in turn output feedback signals reflecting the phase difference between the signals c and d. The output of the low-pass filter 71 is fed through a temperature control circuit 10a back to the light source 1; the output of the low-pass filter 72 is fed through a current control circuit 10b and a driving circuit 10c back to the light source 1. Because of its slow response, the feedback signal for temperature control is given a longer time constant. And because it has a high wavelength change rate, the temperature control feedback signal is used for coarse adjustment. By contrast, because of its high response, the feedback signal for current control is given a shorter time constant. Having a small wavelength change rate, the current control feedback signal is used for fine adjustment.

The signal c is expressed by Expression 1 and the signal d by Expression 2:

Expression 1

$$c = \sin\left[2\pi\left(\frac{2(d1 - d2 - d3)}{\lambda 1} - \frac{2\alpha(t)}{\lambda 1}\right)\right]$$

Expression 2

$$d = \sin\left[2\pi\left(\frac{2(d1 - d2 - d3)}{\lambda 1} + \frac{2L}{\lambda 1} - \frac{2\alpha(t)}{\lambda 1}\right)\right]$$

where, $\alpha(t)$ denotes the amount of movement of the scanning mirror 17. To match the two signals c and d in phase requires that $2L/\lambda 1 = n1$ (n1 is an integer). The oscillation wavelength $\lambda 1$ is fixed to $2L/n1$. Because an incorrect value of n1 causes a different wavelength to be established, the temperature of the semiconductor laser 11 (or 21) needs to be controlled within a certain temperature range with reference to a predetermined temperature (a temperature level with no mode hop nearby). That controlled temperature range is determined by two factors: dependency of oscillation wavelength of the semiconductor laser on temperature, and the amount of stagger L. The long-term stability of the oscillation wavelength is enhanced illustratively by controlling the temperature of the staggered mirror 25 so as to minimize any change in the amount of stagger L thereof.

In the manner described, the signals c and d are matched in phase and the oscillation wavelength $\lambda 1$ of the semiconductor laser 11 at the timing (5) is locked to $2L/n1$. In like manner, the oscillation wavelength $\lambda 2$ of the semiconductor laser 21 at the timing (6) is locked to $2L/n2$. The arrangements above are used in combination with an automatic power control (APC) circuit, not shown.

When the drive pulses of the semiconductor laser 11 are current-modulated in the manner of the signal (1) in Fig. 2, two different oscillation wavelengths may be acquired from one semiconductor laser 11 (or 12). By the above method, the oscillation wavelength at the timing (5) is stabilized. At this point, the injection current is raised (or reduced) so as to obtain a different wavelength at a timing (7). Because the wavelength at the timing (7) differs only slightly from that at the timing (5), the wavelength at the timing (7) is stabilized by controlling the current value (for raising or lowering the injection current) so as to keep an appropriate phase difference between the outputs of the filters 52 and 53 in FIG. 3. Alternatively, the wavelength is stabilized by simply keeping the current value accurate (for raising or lowering the injection current). If the wavelength at the timing (7) is denoted by $\lambda 1'$, the synthetic wavelength $\Lambda 1$ is given by Expression 3 below:

Expression 3

$$\Lambda 1 = \lambda 1 \cdot \lambda 1' / |\lambda 1' - \lambda 1|$$

The stability of the synthetic wavelength $\Lambda 1$ is determined for the most part by $|\lambda 1' - \lambda 1|$. Thus if the current value remains stable, the fluctuation of the synthetic wavelength is small since the wavelength $\lambda 1'$ varies in keeping with the wavelength $\lambda 1$.

When the feedback loop is in effect, the oscillation wavelengths $\lambda 1$ and $\lambda 2$ of the semiconductor lasers 11 and 12 at constant timings are fixed respectively to $2L/n1$ and $2L/n2$, where n1 and n2 are an integer each. The synthetic wavelength $\Lambda 2$ obtained by combining these two wavelengths is also fixed to a value of 2 L reduced by a factor of an integer, as expressed by Expression 4:

Expression 4

$$\Lambda2 = \lambda1 \cdot \lambda2 / |\lambda1 - \lambda2| = 2 L / |n2 - n1| = 2 L/n$$

Thus any desired synthetic wavelength may be obtained by appropriately selecting two semiconductor lasers.

As described, the pulse-driven semiconductor laser may be stabilized in wavelength at a constant timing. Likewise, a plurality of wavelength stabilizing semiconductor lasers that oscillate alternately may also be implemented. When light is extracted using the same timing from the output light of the multiple light sources for signal processing, the multiple signals of different wavelengths are made available simultaneously.

Another way to achieve wavelength stabilization is by resorting to a feedback method whereby the pulses for driving a semiconductor laser are controlled in width. Suppose that the timing signals (5) and (6) as well as the drive pulse signals (1) and (2) in FIG. 2 are fixed in their extinction timings. In that case, the drive pulse signals (1) and (2) are varied in light emission timings so as to change the waveforms (3) and (4) in wavelength. That in turn varies the oscillation wavelength. These relations are utilized in implementing the necessary feedback loop. As shown in FIG. 3, the output of the lowpass filter 71 is fed through the temperature control circuit 10a back to the light source 1, as described earlier. The output of the low-pass filter 72 is fed through a pulse width control circuit 10d and a pulse driving circuit 10e, not shown, back to the light source 1. In this example, the maximum duty factor for the pulse width is 50. Because this feedback method achieves wavelength stabilization by controlling temperature and pulse width, control of the injection current may be relegated to the APC alone.

In this manner, three different wavelengths oscillated alternately by two semiconductor lasers using the timings described are stabilized. These wavelengths are combined to produce two synthetic wavelengths which are also stabilized as described.

Where the emphasis is only on wavelength stabilization with the above method, the scanning mirror 17 need only scan the interference fringes. There is no need to consider the nonlinearity, amplitude fluctuation or origin displacement of the scanning mirror 17. The effect of such movements as yawing of the scanning mirror 17 is offset by use of the condenser lens 16 having an appropriate focal length in front of the mirror, as shown in FIG. 1.

How the embodiment of the invention takes measurements will now be described in detail. Since the amount of movement of the piezoelectric device 18 is not sufficient to generate synthetic wavelength signals, two out of the three different wavelengths are combined to produce two different synthetic wavelengths as described. Individual fringe scan signals of the two synthetic wavelengths are checked for their phase relations whereby measurements of absolute lengths are taken.

More specifically, the phase relations between the individual wavelengths $\lambda1$ and $\lambda1'$ are used to take absolute length measurements within the synthetic wavelength $\Lambda1$. Then the phase relations between the wavelengths $\lambda1$ and $\lambda2$ are used to take more precise absolute length measurements within the synthetic wavelength $\Lambda2$. If higher precision is required, the phase of the individual wavelength $\lambda1$ (or $\lambda2$) may be measured.

The outputs of the detectors 34 and 36 are used to take the measurements. The output of the detector 34 provides the origin from which to measure the length by use of Expression 5 below (see FIG. 1):

Expression 5

$$2D0 = 2\{d1 - (d2 + d3)\}$$

The output of the detector 36 is used to calculate Expression 6 below:

Expression 6

$$2D1 = 2\{d5 - (d4 + d3)\}$$

Given the difference between the above two results, the final output D is then obtained by use of Expression 7:

Expression 7

$$D = D1 - D0 = d5 - d4 - d1 + d2$$

The output signals of the detectors 34 and 36 in FIG. 3 are converted from analog to digital format by A/D converters 40 and 41 in FIG. 1 using the timings (5), (6) and (7) of FIG. 2. The A/D conversion provides individual channels of the wavelengths $\lambda1$, $\lambda2$ and $\lambda1'$ that are placed in RAM's 42 and 43. Thereafter, signal processing is performed suitably by software for phase measurement. It is assumed here that the scanning mirror 17 is always swept at constant speed or is at least swept thus whenever signal processing is carried out as discussed below.

Figure 5:
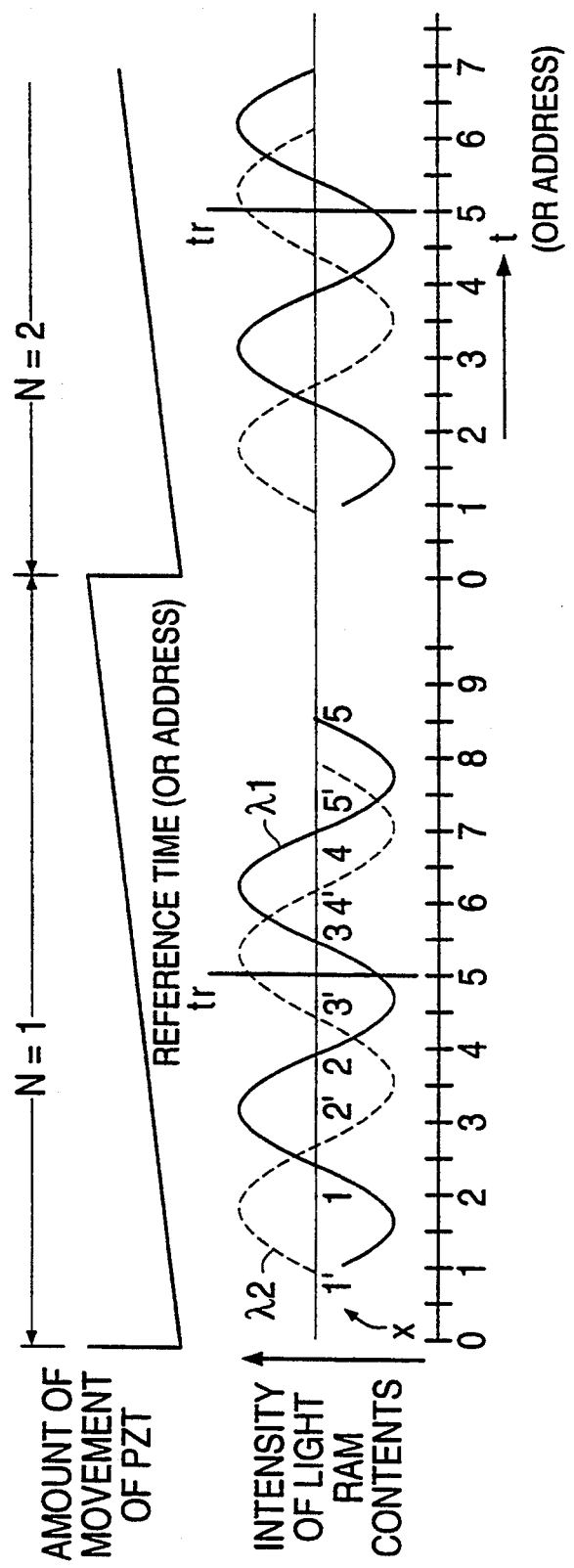
FIG. 5 is a view illustrating how signal processing is carried out by the embodiment, the emphasis being on fringe scan signals.
Figure 6:
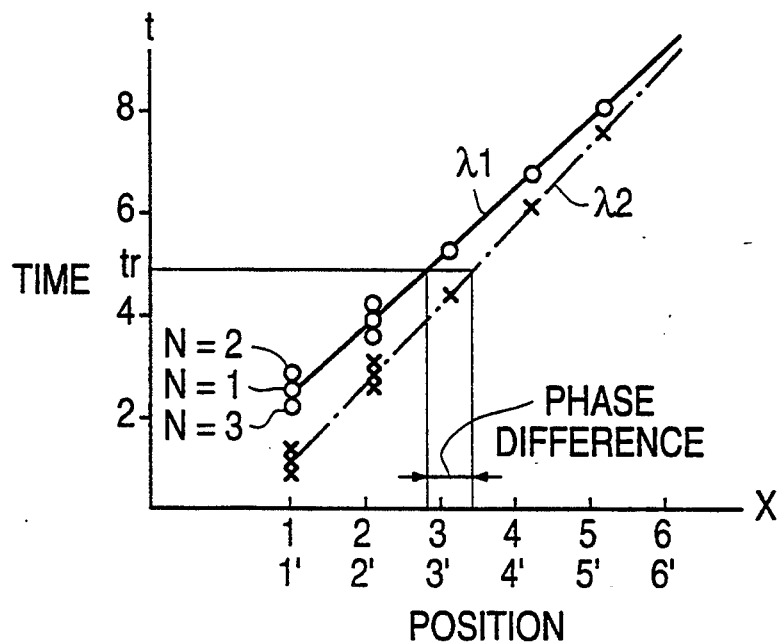
FIG. 6 is a view plotting the positions and the points in time of zero-cross points included in the fringe scan signals of Fig. 5.
Figure 7:
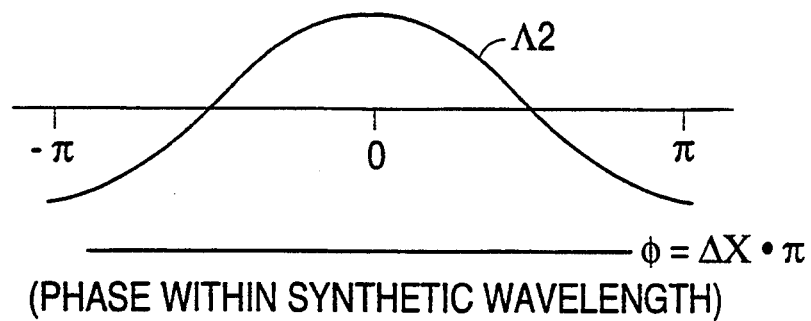
FIG. 7 is a view showing a typical phase of a synthetic wavelength signal obtained from the process of Fig. 6.

FIGS. 5 through 7 describe how signal processing is typically carried out with the embodiment. It is assumed as an example that the signals from the detector 36 are to be processed. For the sake of simplicity, this example only shows how the phase relations between the wavelengths $\lambda1$ and $\lambda2$ are obtained (in RAM image).

The signals of the two wavelengths $\lambda1$ and $\lambda2$ placed in the RAM 48 are first filtered appropriately. The filtering provides the fringe scan signals of FIG. 5. The zero-cross points of these signals are obtained, and the points in time t (or addresses) corresponding to these zero-cross points are plotted, as shown in FIG. 6. The axis of abscissa X indicates zero-cross point numbers (the first starting number is 1 in FIG. 6). The same also applies to subsequent fringe scan periods (N=2, 3, ...) Then the method of least squares is applied to the points on the two wavelengths $\lambda1$ and $\lambda2$ for linear fitting. At a reference time tr, a discrepancy (phase difference) of $\Delta X$ is obtained between two straight lines. The value $\Delta X$ falls within the range of $$-1 \leq \Delta X \leq +1$$

Here, the phase $\Phi$ in the synthetic wavelength $\Lambda2$ obtained by combining the wavelengths $\lambda1$ and $\lambda2$ is given by Expression 8 (see FIG. 7):

Expression 8

$$\Phi = \Delta X \cdot \pi \text{ (rad)}$$

Figure 8:
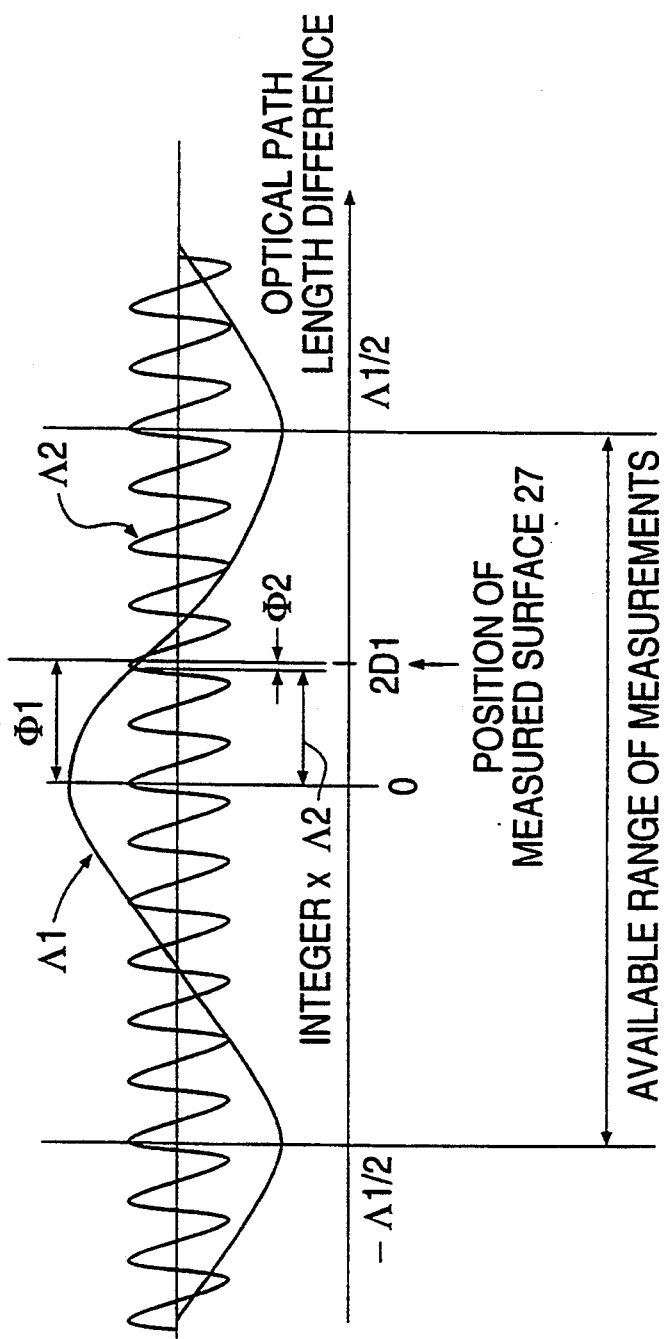
FIG. 8 is a view depicting waveforms of synthetic wavelengths in connection with the embodiment.

The phase of the individual wavelength $\lambda1$ (or $\lambda2$) is readily obtained from the X coordinate value at the reference time tr. The phase relations between the wavelengths $\lambda1$ and $\lambda1'$ are also obtained in like manner. Based on the results above, the value D1 is derived from the signals of the detector 38 in FIG. 1 as illustrated in FIG. 8. The phase $\Phi 1$ within the synthetic wavelength $\Lambda 1$ obtained from the combination of the wavelengths $\lambda 1$ and $\lambda 1'$ is acquired based on the phase relations therebetween. Thus one gets Expression 9:

Expression 9

$$2D1 = 2\{d5 - (d3+d4)\} = \Lambda 1 \times \Phi \tfrac{1}{2}\pi$$

Then it is determined how many waves (i.e., an integer count plus fractions) of the synthetic wavelength $\Lambda 2$ derived from the combination of the wavelengths $\lambda 1$ and $\lambda 2$ corresponds to the phase $\Phi 1$. The fractions are determined by the phase $\Phi 2$ within the synthetic wavelength $\Lambda 2$. These relations are stipulated in Expression 10, to be shown below. Furthermore, the value D1 is determined more precisely based on the phase of the individual wavelength $\lambda 1$ (or $\lambda 2$), not shown. The range of measurements is given as the optical path length difference corresponding to one wave of the longest synthetic wavelength $\Lambda 1$. In like manner, the signals from the detector 34 are used for phase measurement whereby the value D0 is calculated. From the difference between the two results above, the final output D is obtained by use of Expression 7. Because the optical path portion d3 is canceled, the adverse effect of a dislocated scanning mirror 17 at the reference time tr is eliminated. Since it is impossible to find the exact values of the synthetic wavelengths $\Lambda 1$ and $\Lambda 2$ as well as individual wavelength $\lambda 1$ (or $\lambda 2$), known lengths need to be measured and the relevant parts need to be calibrated accordingly. It should be noted that the above phase relations can be calculated simultaneously. This capability of simultaneous calculation contributes to drastically curtailing the measuring time.

Expression 10

$$2\ D1 = (\text{integer} \times \Lambda 2) + \Lambda 2 \times \Phi 2 / 2\pi$$

As described, the scanning mirror 17 is swept by the piezoelectric device 18 to generate the fringe scan signals. The signals are in turn used to find the phase relations between any two wavelengths. The results provide measurements of the absolute distance to the object of measurement, i.e., to the reflecting mirror 27. Unlike in conventional setups, there is no need to actually generate synthetic wavelength signals by shifting the scanning mirror 17 by the amount of the synthetic wavelength.

When the signals $\lambda 1$ and $\lambda 2$ are extracted from the output of the detector 34 and their phases are aligned at the reference time tr, the position of the scanning mirror 17 is fixed, though not shown, at that reference time tr. Specifically, a phase mismatch error signal need only be fed back to the DC voltage of the piezoelectric device 18. The feedback arrangement keeps the relationship d1=d2+d3 unchanged. As a result, the calculation of phase relations for measuring the distance to the reflecting mirror 27 is accomplished by simply processing the signals of the detector 86 appropriately.

The invention as embodied above may also be applied to measuring the shapes of objects including their roughened surfaces. Such measurements are made possible by inserting an objective lens 29 as shown by broken line in FIG. 1. In such a case, the farther the optical path length difference from 0, the greater the errors accumulated depending on the wavelength stability of the semiconductor lasers installed. The errors are minimized by preferably locating the objective lens 29 so that its focal point satisfies the relationship $$d3+d4=d5$$

Measurements of the absolute length are thus made possible even if the surface to be measured is away from the focal point.

In sum and as described, the absolute length measuring apparatus according to the invention offers the wavelength stabilizing function for use with a plurality of light sources such as semiconductor lasers that oscillate alternately. The embodiment constitutes a compact, semiconductor laser-based absolute length measuring apparatus.

In operation, the reflector on one arm in the interferometer is swept by the piezoelectric device, and the output of the light receiver is divided by time at various wavelength timings. The time division provides fringe scan signals for each of the wavelengths involved. Then the phase relations between the signals of any two wavelengths are obtained for length measurement. The inventive absolute length measuring apparatus is of a simple construction with no need for a bulky, elaborate movable stage with which to generate synthetic wavelength signals.

Furthermore, the ability of the inventive apparatus to calculate simultaneously the phase relations between multiple wavelengths shortens the measuring time considerably.

The fact that the absolute length measuring apparatus according to the invention utilizes semiconductor lasers instead of carbon dioxide gas lasers provides two distinct benefits: a downsized apparatus, and reduced manufacturing costs thereof.

Another benefit of the invention is that its embodiment does not actually generate synthetic wavelength signals but assumes them instead. It follows that the distance to the object of measurement is obtained very quickly based on the assumed synthetic wavelength signals.

Although the description above contains many specificities, these should not be construed as limiting the scope of the invention but as merely providing illustrations of the presently preferred embodiment of this invention. For example, the number of semiconductor lasers and that of wavelengths may be changed from those used in the above-described embodiment. The circuit constitution of the embodiment and its signal processing method may also be varied as needed.

Thus the scope of the invention should be determined by the appended claims and their legal equivalents, rather than by the examples given.

What is claimed is:

1. An absolute length measuring apparatus comprising:

light sources for emitting alternately a plurality of coherent light beams having different wavelengths;

a beam splitter for splitting the coherent light beam from said light sources into two optical paths;

an object of measurement located on one of the two optical paths stemming from said beam splitter;

a scanning mirror located on the other optical path stemming from said beam splitter and made movable in the direction of optical axis;

a light receiver for receiving both the reflected light beam from said object of measurement and the reflected light beam from said scanning mirror through said beam splitter;

sampling parts for generating sampling signals of various wavelengths by sampling the output of said light receiver every time said light sources emit a coherent light beam while scanned by said scanning mirror; and a distance measuring part for assuming a synthetic wavelength signal having a wavelength sufficiently greater than any individually generated wavelength based on the phase relations of said sampling signals, and for measuring the distance to said object of measurement in accordance with said synthetic wavelength signal.

2. An absolute length measuring apparatus according to claim 1, wherein said light sources comprise:

semiconductor lasers for emitting a plurality of coherent light beams having different wavelengths; and pulse drivers for supplying pulses alternately to said semiconductor lasers.

3. An absolute length measuring apparatus according to claim 1, wherein, if one of said coherent light beams has a first wavelength $\lambda 1$ and another a second wavelength $\lambda 2$, said distance measuring part assumes the wavelength $\Lambda$ of said synthetic wavelength signal to be a least common multiple of said first wavelength $\lambda 1$ and said second wavelength $\lambda 2$; and wherein said distance measuring part measures the distance to said object of measurement based on the phase $\Phi$ of said synthetic wavelength signal derived at the time of measurement from the phase relations between the sampling signals having said first and said second wavelength.

4. An absolute length measuring apparatus according to claim 2, wherein, if one of said coherent light beams has a first wavelength $\lambda 1$ and another a second wavelength $\lambda 2$, said distance measuring part assumes the wavelength $\Lambda$ of said synthetic wavelength signal to be a least common multiple of said first wavelength $\lambda 1$ and said second wavelength $\lambda 2$; and wherein said distance measuring part measures the distance to said object of measurement based on the phase $\Phi$ of said synthetic wavelength signal derived at the time of measurement from the phase relations between the sampling signals having said first and said second wavelength.

* * * * *